(12) United States Patent
Shteiman et al.

(10) Patent No.: US 9,900,112 B1
(45) Date of Patent: Feb. 20, 2018

(54) METHOD FOR CALIBRATION OF A MIMO ARRAY BASED ON AN OPPORTUNISTIC SIGNAL

(71) Applicant: Futurewei Technologies, Inc., Plano, TX (US)

(72) Inventors: Arkady Molev Shteiman, Basking Ridge, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/449,765

(22) Filed: Mar. 3, 2017

(51) Int. Cl.
*H04B 17/12* (2015.01)
*H04B 7/0413* (2017.01)
*H04B 17/10* (2015.01)

(52) U.S. Cl.
CPC ........... *H04B 17/12* (2015.01); *H04B 7/0413* (2013.01); *H04B 17/104* (2015.01)

(58) Field of Classification Search
CPC ..... H04B 17/12; H04B 17/104; H04B 7/0413
See application file for complete search history.

(56) References Cited

U.S. PATENT DOCUMENTS

| | | | | |
|---|---|---|---|---|
| 2005/0227628 | A1* | 10/2005 | Inanoglu | H04L 25/03343 455/68 |
| 2011/0150119 | A1* | 6/2011 | Kent | H04L 25/0204 375/267 |
| 2014/0098902 | A1* | 4/2014 | Harel | H04B 7/086 375/267 |
| 2016/0142094 | A1* | 5/2016 | Papadopoulos | H04B 17/14 375/219 |
| 2017/0048009 | A1* | 2/2017 | Sarkar | E05D 13/04 |

* cited by examiner

*Primary Examiner* — Syed Haider
(74) *Attorney, Agent, or Firm* — Zilka-Kotab, PC

(57) ABSTRACT

A method, system, and computer-readable medium are provided for calibrating elements of a MIMO array. The method includes the steps of receiving samples of a signal from a plurality of antenna units included in the MIMO array, generating an antenna domain channel estimate based on the samples of the signal received from each antenna unit, estimating a set of spatial parameters based on the antenna domain channel estimate, generating a reconstructed channel based on the estimated set of spatial parameters, comparing the antenna domain channel estimate and the reconstructed channel to determine errors associated with a set of mismatch parameters for each antenna unit, and adjusting the set of mismatch parameters based on the errors. Each antenna unit in the plurality of antenna units is configured to sample the signal based on a clock corresponding with the antenna unit.

25 Claims, 9 Drawing Sheets

METHOD FOR CALIBRATION OF A MIMO ARRAY BASED ON AN OPPORTUNISTIC SIGNAL

FIELD OF THE INVENTION

The present disclosure relates to radio frequency and wireless communications, and more particularly to the calibration of MIMO (multiple input, multiple output) arrays.

BACKGROUND

Wireless networks rely on radio frequency transmission of wireless signals. Each node of a wireless network includes a radio having one or more transceivers for sampling wireless signals on one or more channels. However, the spectrum on which wireless signals can be transmitted is limited (i.e., there are only so many frequencies on which signals can be transmitted, and the spectrum must be shared by a large number of users). Additional techniques need to be utilized to increase the bandwidth of these wireless networks without expanding the spectrum.

MIMO arrays utilize a plurality of antennas to send and receive multiple signals via a single radio frequency channel, thereby increasing the bandwidth of the wireless network without increasing the spectrum over which signals are transmitted. These techniques increase the complexity of the data processing for demodulating the multiple signals and require special calibration of each antenna unit in the MIMO array. Calibration of the antenna units requires additional components that increase the overall cost and complexity of the MIMO array. Additional techniques for calibrating the MIMO array without the additional components could reduce costs and enable MIMO arrays to be utilized in more deployments.

SUMMARY

A method, system, and computer-readable medium are provided for calibrating elements of a MIMO array. The method includes the steps of receiving samples of a signal from a plurality of antenna units included in the MIMO array, generating an antenna domain channel estimate based on the samples of the signal received from each antenna unit, estimating a set of spatial parameters based on the antenna domain channel estimate, generating a reconstructed channel based on the estimated set of spatial parameters, comparing the antenna domain channel estimate and the reconstructed channel to determine errors associated with a set of mismatch parameters for each antenna unit, and adjusting the set of mismatch parameters based on the errors. Each antenna unit in the plurality of antenna units is configured to sample the signal based on a clock corresponding with the antenna unit.

In a first embodiment, each antenna unit includes an antenna coupled to a transceiver.

In a second embodiment (which may or may not be combined with the first embodiment), estimating a set of spatial parameters for each antenna unit in the plurality of antenna units includes measuring a delay associated with each antenna unit.

In a third embodiment (which may or may not be combined with the first and/or second embodiments), the set of mismatch parameters for a particular antenna unit in the plurality of antenna units includes a delay parameter of the particular antenna unit, a gain parameter of the particular antenna unit, and a phase parameter of the particular antenna unit.

In a fourth embodiment (which may or may not be combined with the first, second, and/or third embodiments), comparing the antenna domain channel estimate and the reconstructed channel to determine errors associated with the set of mismatch parameters for a particular antenna unit includes generating an error for the delay parameter of the particular antenna unit, an error for the gain parameter of the particular antenna unit, and an error for the phase parameter of the particular antenna unit.

In a fifth embodiment (which may or may not be combined with the first, second, third, and/or fourth embodiments), the error for the delay parameter of the particular antenna unit is generated utilizing at least one of: a delay locked loop; a phase shift measurement in a frequency domain; and a correlation between the reconstructed channel and delayed versions of the antenna domain channel estimate.

In a sixth embodiment (which may or may not be combined with the first, second, third, fourth, and/or fifth embodiments), the error for the gain parameter of the particular antenna unit is generated by calculating a difference between a maximum magnitude of the antenna domain channel estimate and a maximum magnitude of the reconstructed channel.

In a seventh embodiment (which may or may not be combined with the first, second, third, fourth, fifth, and/or sixth embodiments), the error for the phase parameter of the particular antenna unit is generated by calculating a difference between a phase of the antenna domain channel estimate at a time corresponding to a maximum magnitude of the antenna domain channel estimate and a phase of the reconstructed channel at a time corresponding to a maximum magnitude of the reconstructed channel.

In a seventh embodiment (which may or may not be combined with the first, second, third, fourth, fifth, sixth, and/or seventh embodiments), adjusting the set of mismatch parameters based on the errors comprises, for at least one mismatch parameter in the set of mismatch parameters, adding the current mismatch parameter to an error for the mismatch parameter multiplied by a coefficient, wherein the coefficient is less than or equal to one.

To this end, in some optional embodiments, one or more of the foregoing features of the aforementioned apparatus, system, and/or method may afford a MIMO array that, in turn, may enable the calibration of the MIMO array without more complex components being included in the MIMO array specifically for calibration. It should be noted that the aforementioned potential advantages are set forth for illustrative purposes only and should not be construed as limiting in any manner.

DETAILED DESCRIPTION

A simpler MIMO array that can be calibrated using an opportunistic signal is described in more detail below. Analysis of an antenna domain channel estimate and a reconstructed channel for the opportunistic signal may be used to adjust configuration parameters of the MIMO array without needing to generate a reference signal from a known sequence of training symbols. This enables the MIMO array hardware to be much simpler and cheaper to implement.

Figure 1:
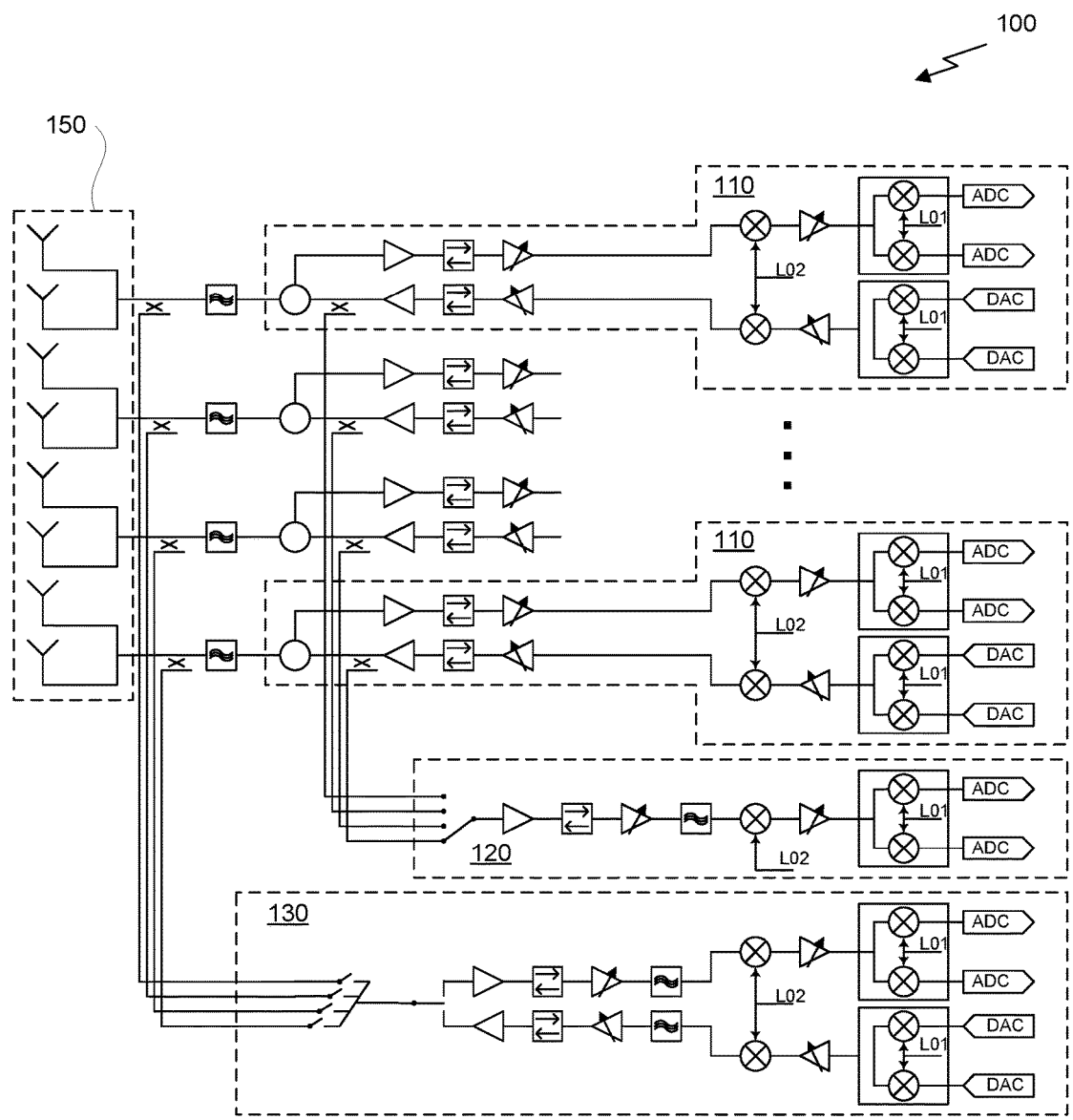
FIG. 1 illustrates a massive MIMO array, in accordance with the prior art.

FIG. 1 illustrates a massive MIMO array 100, in accordance with the prior art. Massive MIMO refers to an antenna array with a large number of antennas (e.g., 8 transmitter antennas by 8 receiver antennas, or more). As shown in FIG. 1, the MIMO array 100 includes a plurality of antennas 150 coupled to a plurality of transceivers 110. The transceivers 110 each include a transmitter and a receiver for sending or receiving data via one of the antennas 150. The transmitters are coupled to analog-to-digital converters (ADC) and the receivers are coupled to digital-to-analog converters (DAC). Each of the transmitters and receivers may also include various electronic components such as variable gain amplifiers, filters, and the like.

The signal generated by each transmitter in the transceivers 110 is coupled to the input of a measurement receiver 120 via a coupler. The measurement receiver 120 is utilized to measure the signal generated by the transmitter in order to provide a feedback loop for calibration of the transmitter. Logic controlling the MIMO array 100 may transmit a calibration signal on a given transmitter and measure a response signal at the output of the transmitter. From the measured response, the logic may adjust various parameters to configure the transmitter. Consequently, each transmitter can be calibrated to account for effects of the difference between circuit elements in each of the transmitters.

However, with massive MIMO arrays, such as MIMO array 100, the receivers will also need to be calibrated in order to accurately register each of the received signals to the other signals. More specifically, a plurality of receivers sample signals on each of the antennas 150 and then process the sampled signals to demodulate symbols transmitted on the same wireless channel. An RF signal will arrive at each of the antennas 150 at different times because each of the antennas is located at a different position in 3D space. In addition, the sampled signal measured at each receiver may have different gains or phase offsets due to manufacturing differences in the electronic components as well as differences in the sampling clocks at each receiver (i.e., even if the clock for each receiver is generated by a common oscillator, different routes to the receiver can lead to a relative shift in the phase of each clock). Furthermore, the relative phase difference of each clock can affect the gain (i.e., peak amplitude) of the sampled signals. Consequently, processing the signals from each antenna to demodulate symbols requires accurate registration of each sampled signal to account for a delay of each signal.

Conventional MIMO arrays may include a calibration transceiver 130 that is utilized to induce a reference signal at the antenna. Similar to the measurement receiver 120, the calibration transceiver 130 may be coupled to the antennas 150 via a coupler. The receivers in the various transceivers 110 are then used to sample the reference signal induced at the antenna in order to estimate the gain, phase, and time offset for each receiver.

While this system is useful for calibrating a massive MIMO array, the additional components of the calibration transceiver 130, a switch to couple each antenna to a single calibration transceiver 130, and couplers increase the cost and complexity of the massive MIMO array 100. Consequently, a technique for calibrating the MIMO array 100 that does not require the calibration transceiver 130 would enable the cost and complexity of the MIMO array to be reduced.

Figure 2:
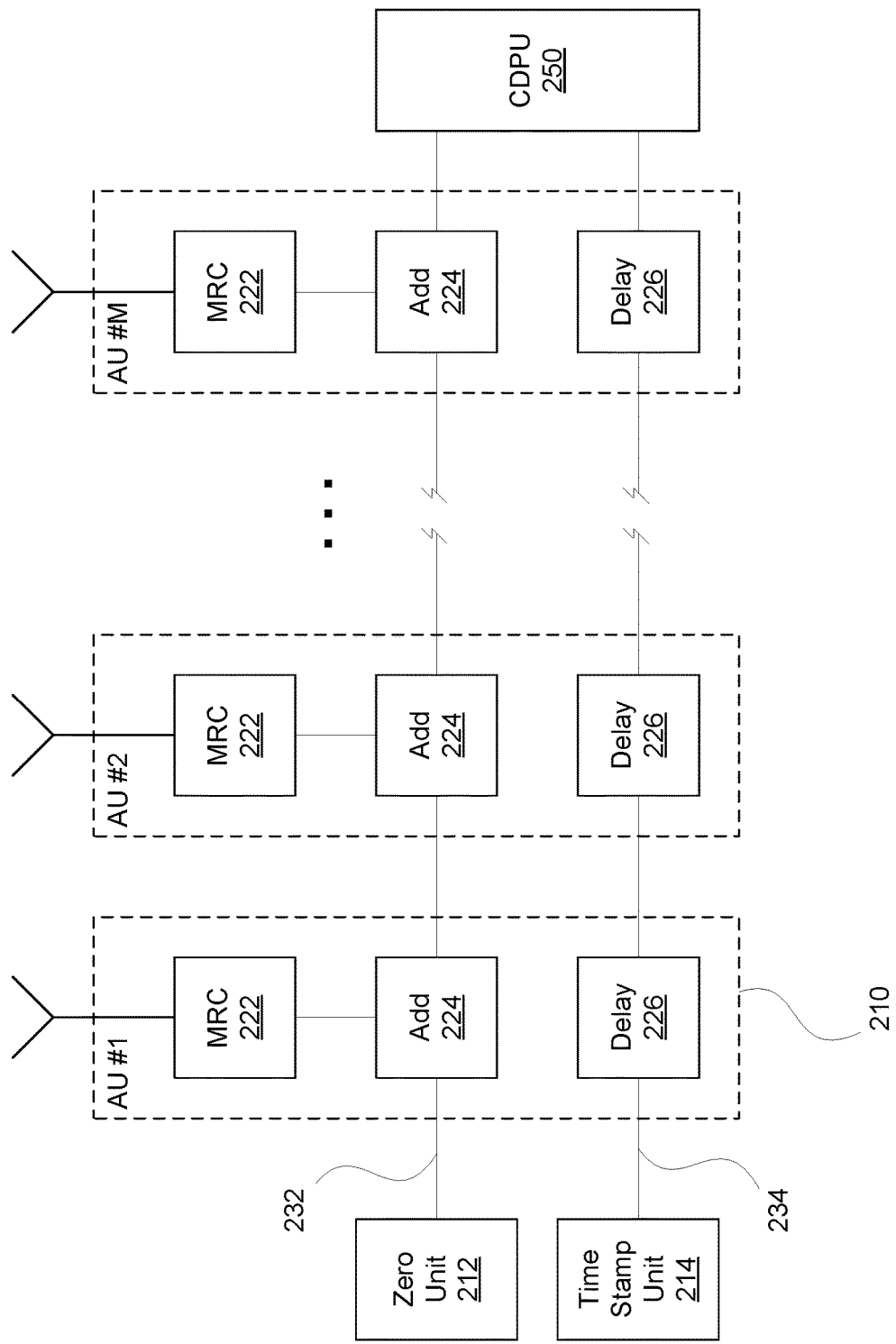
FIG. 2 illustrates a technique for demodulating signals received over the MIMO array 100, in accordance with one embodiment.

FIG. 2 illustrates a technique for demodulating signals received over the MIMO array 100, in accordance with one embodiment. The technique utilizes maximal-ratio combining (MRC) in order to boost the signal-to-noise ratio (SNR) of the received signal. When the same signal is received at multiple antennas, the goal is to combine the signals to get a stronger signal with less noise. However, simply combining the signals is not productive because the signals are not aligned, so the signals will interfere with each other, similar to multi-path fading. Instead, the goal is to combine delayed signals so that the combined samples of the delayed signals are all aligned.

As shown in FIG. 2, each antenna unit 210 includes an MRC unit 222, an addition unit 224, and a delay unit 226. The first antenna unit 210 is coupled to a zero unit 212 and a timestamp unit 214. The zero unit 212 produces a zero value on a sample signal 232 that is provided to the input of the addition unit 224 of the first antenna unit 210. In one embodiment, the sample signal 232 is a digital signal that is configured to accumulate registered sample values from all of the antenna units 210 prior to being input to a channel decoder processing unit (CDPU) 250. Simultaneously, the time stamp unit 214 provides a timestamp 234 to the input of the delay unit 226 of the first antenna unit 210 using a free running clock.

Each MRC unit 222 samples the signal received at a corresponding antenna 150 via a transceiver 110 using a sampling clock at a sampling frequency. The MRC unit 222 transmits samples to the addition unit 224, which buffers a number of samples received from the MRC unit 222 and adds them to the sample signal 232 at a time corresponding to a delay offset for the antenna unit 210. Once the delayed sample has been added to the sample signal 232, the sample signal 232 and the timestamp 234 are forwarded to the next antenna unit 210. Once the sample signal 232 has accumulated a sample from each antenna unit 210, the sample signal 232 and timestamp 234 are input to the CDPU 250 for processing.

Figure 3:
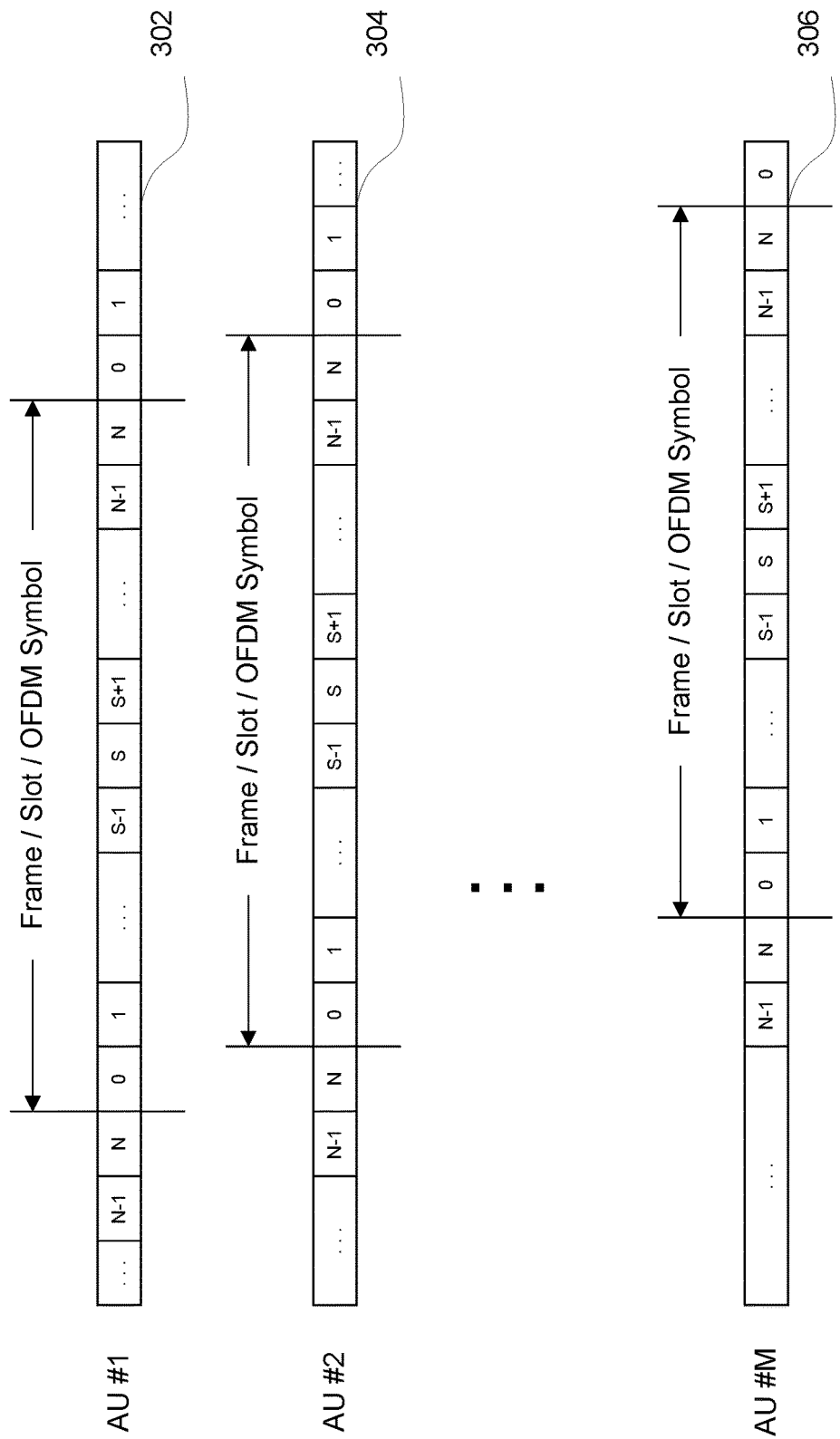
FIG. 3 illustrates signals received at a plurality of antenna units, in accordance with one embodiment.

FIG. 3 illustrates signals received at a plurality of antenna units, in accordance with one embodiment. As shown in FIG. 3, a first signal 302 is sampled by a first antenna unit, AU #1; a second signal 304 is sampled by a second antenna unit, AU #2; . . . and an $m^{th}$ signal 306 is sampled by the $m^{th}$ antenna unit, AU #M. Each of the signals (i.e., 302, 304, . . . and 306) are offset relative to the other signals. It is clear to see that a frame arrives at the first antenna unit, AU #1 at a first time, the frame arrives at the second antenna unit, AU #2, at a later time (approximately 1 symbol time in FIG. 3), and the frame arrives at the third antenna unit, AU #3, at yet a later time. Consequently, the addition units 224 of the various antenna units 210 need to be configured such that a particular sample of the frame received at the first antenna unit, AU #1, is added to a corresponding sample of the frame received at the second antenna unit, AU #2, and so forth for all M antenna units.

As shown in FIG. 3, each frame of the signal is sampled N+1 times to produce N+1 samples of the signal for the frame. It will be appreciated that the frame may represent a time period for transmitting a single symbol on a channel. In other words, a symbol is transmitted via the channel by modulating a carrier wave based on the symbol for a set frame period. Multiple symbols may be transmitted in sequence to transmit data via the wireless channel. Each frame, therefore, represents a time period on which the symbol is transmitted via the channel. In one embodiment, a channel may use quadrature amplitude modulation (QAM) such as QAM16 to transmit symbols via the channel. The frame may be sampled in order to decode the particular symbol transmitted via the wireless channel.

In one embodiment, the N+1 samples are summed along the MRC chain to produce N+1 combined samples provided to the CDPU 250 that represents the symbol transmitted via the wireless channel. The CDPU 250 may then demodulate the combined signal to generate an estimate for the symbol corresponding to the frame.

It should be clear that the delay units 226 are configured with a time offset to align the samples of each signal (i.e., 302, 304, . . . and 306) so that the samples are properly accumulated on the sample signal 232. Consequently, the time offset for each delay unit 226 represents a relative delay between the signal at a particular antenna unit 210 and a reference time. The timestamp 234 encodes a common reference point that each antenna unit 210 may use to align the samples of the signal. Again, the addition units 224 buffer multiple samples because the time at which a sample is added to the sample signal 232 at a particular antenna unit 210 may be significantly later than when the sample was generated by the MRC 222. As each sample signal 232 and timestamp 234 arrive at the antenna unit 210, the delay unit 226 may calculate an offset into the buffer, based on the timestamp 234 and the time offset for the antenna unit 210. The offset into the buffer is transmitted to the addition unit 224 in order to select the proper sample from the buffer to add to the sample signal 232.

In the prior art MIMO array 100, the internal delay of each antenna unit 210 could be properly configured using the reference signal and the calibration transceiver 130. However, any opportune signal received via the wireless channel can be used to calibrate the delay of each antenna unit in order to properly register the signals received by each antenna unit 210. This enables the complexity of the MIMO array 100 to be drastically reduced by omitting the calibration transceiver 130 and any associated hardware coupling the calibration transceiver 130 to the plurality of antennas 150.

Figure 4:
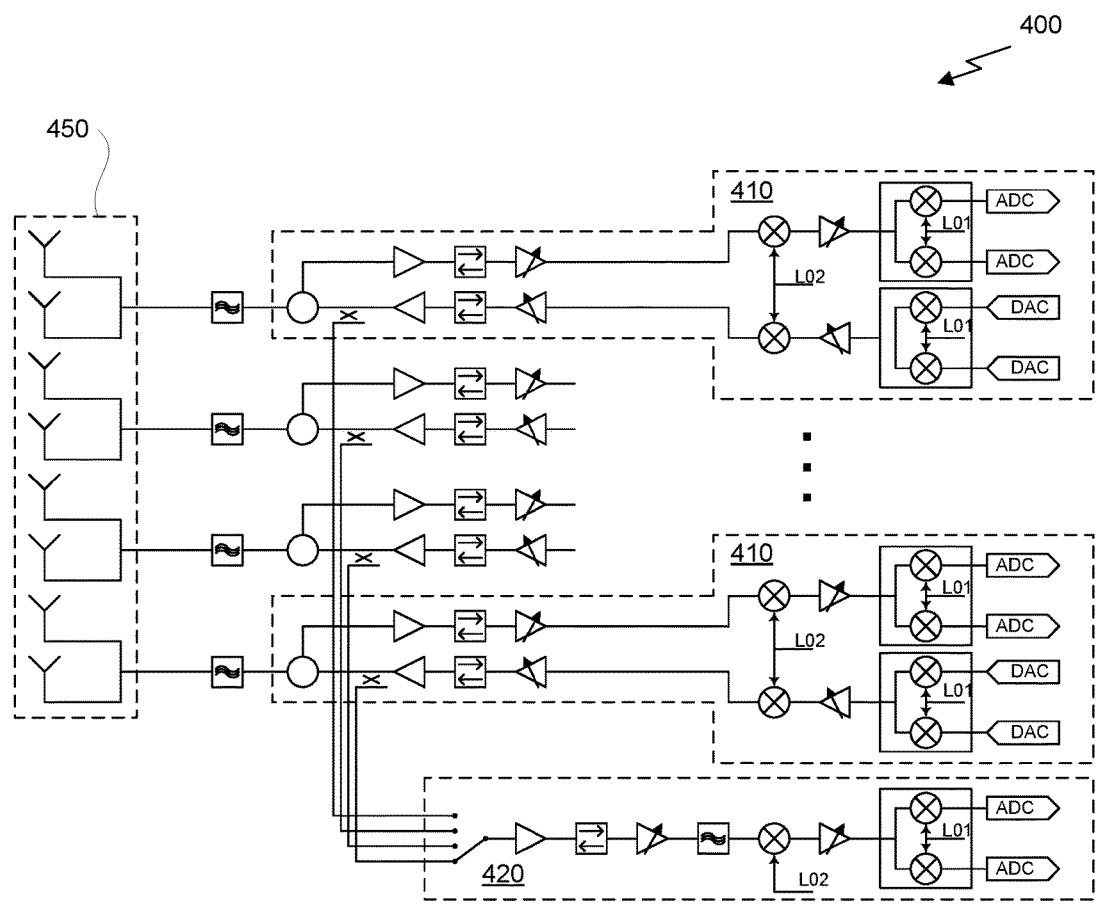
FIG. 4 illustrates a MIMO array, in accordance with one embodiment.

FIG. 4 illustrates a MIMO array 400, in accordance with one embodiment. Similar to the MIMO array 100, the MIMO array 400 includes a plurality of antennas 450 coupled to a plurality of transceivers 410. The MIMO array 400 also includes a measurement receiver 430 coupled to the output of each of the transmitters of the transceivers 410 to provide a feedback loop for calibrating the transmitters. However, the MIMO array 400 does not include a calibration transceiver 130. Instead, calibration of the MIMO array 400 may be performed using an opportunistic signal transmitted by regular user equipment (UE). In other words, each of the antenna units of the MIMO array 400 may utilize a signal transmitted by any UE transmitting on the wireless channel.

The gain, phase, and time offset of each antenna unit 210 are critical to proper demodulation of the signal at the CDPU 250. Consequently, the calibration routine for estimating the gain, phase, and time offset of each antenna unit 210 is vital for proper operation of the MIMO array 400. In the prior art, the calibration transceiver 130 is utilized to induce a signal on one antenna and measure the response at the receivers of each of the antenna units. The signals may then be compared in order to estimate the gain, phase, and time offset for each antenna unit.

Channel estimation in an antenna domain is given by the following equation:

$$\hat{h}_{m,k}(n) = \frac{1}{N_{REF}} \cdot \sum_{n_T=1}^{N_{REF}} ref_k^*(n_T) \cdot y_m(n_T - n), \quad \text{(Eq. 1)}$$

where: $y_m(n)$ is the sampled signal at antenna unit m at time n; $ref_k^*(n)$ is a reference sequence with length $N_{REF}$; and $\hat{h}_{m,k}(n)$ is a channel estimation based on the reference sequence. The channel estimation in the antenna domain can also be written in terms of the gain, phase, and time offset, which may be referred to herein as mismatch parameters, for the particular antenna unit as:

$$\hat{h}_{m,k}(n) = g_m \cdot e^{(j\varphi_m)} \cdot h_{m,k}\left(n + \frac{\tau_m}{T_S}\right) + \text{noise}_{m,k}(n), \quad \text{(Eq. 2)}$$

where: $h_{m,k}(n)$ is the real channel; $\tau_m$ is the time offset for antenna unit m; $g_m$ is the gain offset for antenna unit m; $\varphi_m$ is the phase offset of antenna unit m; and $T_S$ is the sampling period. The calibration transceiver 130 transmits the reference sequence $ref_k^*(n)$ coupled to one of the antennas 150 of the MIMO array 100. The signal induced on the antenna is then sampled by the corresponding receiver connected to the antenna to measure the signal $y_m(n)$, which can then be used to estimate the gain offset, phase offset, and time offset for antenna unit m by equating Equations 1 and 2.

In contrast, the MIMO array 400 does not include the calibration transceiver 130 and, consequently, there is no way to generate the sampled signal $y_m(n)$ using the reference sequence $ref_k^*(n)$. Instead, each antenna unit 210 may be configured to measure an internal delay of the antenna unit 210 by analyzing an opportunistic signal received at the antenna unit. In one embodiment, the opportunistic signal includes a guard interval between each frame (or alternately, included at the beginning or end of each frame). Consequently, an antenna unit 210 may detect the beginning of the frame in the wireless signal in order to estimate a delay offset for the antenna unit 210. Each of the independently measured delay offsets can then be used to estimate the spatial parameters for each antenna unit 210 that are used to calibrate the MIMO array 400 without the use of the special training sequence. The spatial parameters may refer to a gain, phase shift, delay, and orientation associated with each signal path for a user arriving at an antenna (e.g., $\breve{g}_{k,s}$, $\breve{\varphi}_{k,s}$, $\breve{\alpha}_{k,s}$, $\breve{\beta}_{k,s}$, and $\breve{\tau}_{k,s}$) and may be reflective of the arrangement of antennas in the external environment (e.g., spacing, location relative to other objects, etc.).

Figure 5:
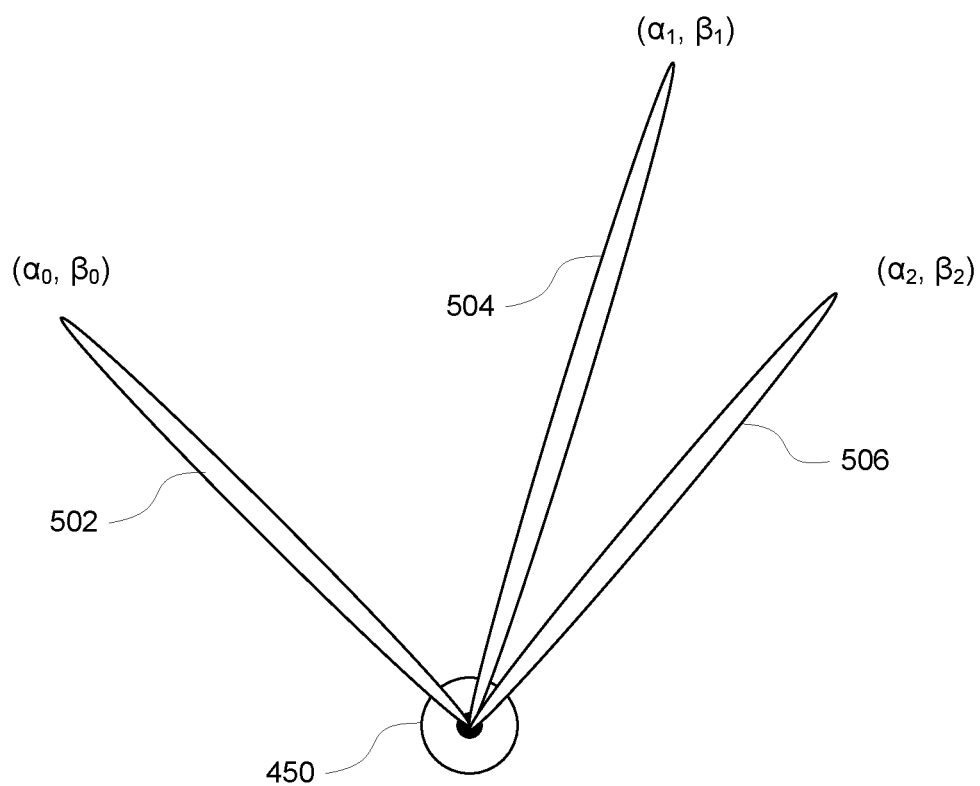
FIG. 5 illustrates a multi-beam channel model for a single antenna, in accordance with one embodiment.

FIG. 5 illustrates a multi-beam channel model for a single antenna 450, in accordance with one embodiment. An antenna 450 can pick up RF signals from multiple paths and/or multiple users. Each user may send a signal that arrives at the antenna 450 via one or more paths. As shown in FIG. 5, the antenna 450 may receive three paths: a first path 502, a second path 504, and a third path 506. Each path will arrive at the antenna 450 from a particular direction. A multi-beam channel model for the channel $h_{m,k}(n)$ is given by the following equation:

$$h_{m,k}(n) = \sum_{s=1}^{S} g_{k,s} \cdot e^{(j\varphi_{k,s})} \cdot \delta\left(n - \frac{1}{T_S} \cdot (\tau_{x,y,z} + \tau_{k,s} + \tau_m)\right), \quad \text{(Eq. 3)}$$

where: $(\alpha_{k,s}, \beta_{k,s})$ is the direction of path s of user k (where a refers to an azimuth angle in the x-y plane and β refers to the zenith angle); $g_{k,s}$ is the gain of path s of user k; $\varphi_{k,s}$ is the phase of path s of user k; $\tau_m$ is an internal delay offset of antenna unit m; $\tau_{k,s}$ is a delay offset of path s of user k; and $\tau_{x,y,z}$ is an external delay offset of antenna unit m based on a position $<x_m, y_m, z_m>$ of antenna unit m. The external delay offset associated with antenna unit m is given by the following equation:

$$\tau_{x,y,z} = \frac{x_m \cdot \cos(\alpha_{k,s}) \cdot \cos(\beta_{k,s}) + y_m \cdot \cos(\alpha_{k,s}) \cdot \sin(\beta_{k,s}) + z_m \cdot \sin(a_{k,s})}{c}, \quad \text{(Eq. 4)}$$

where c is the speed of light in a vacuum. It will be appreciated that the external delay offset associated with antenna unit m is reflective of the relative positioning of each antenna in the MIMO array 400, whereas the delay offset of path s of user k is based on the different lengths of the paths s to a given antenna.

Figure 6:
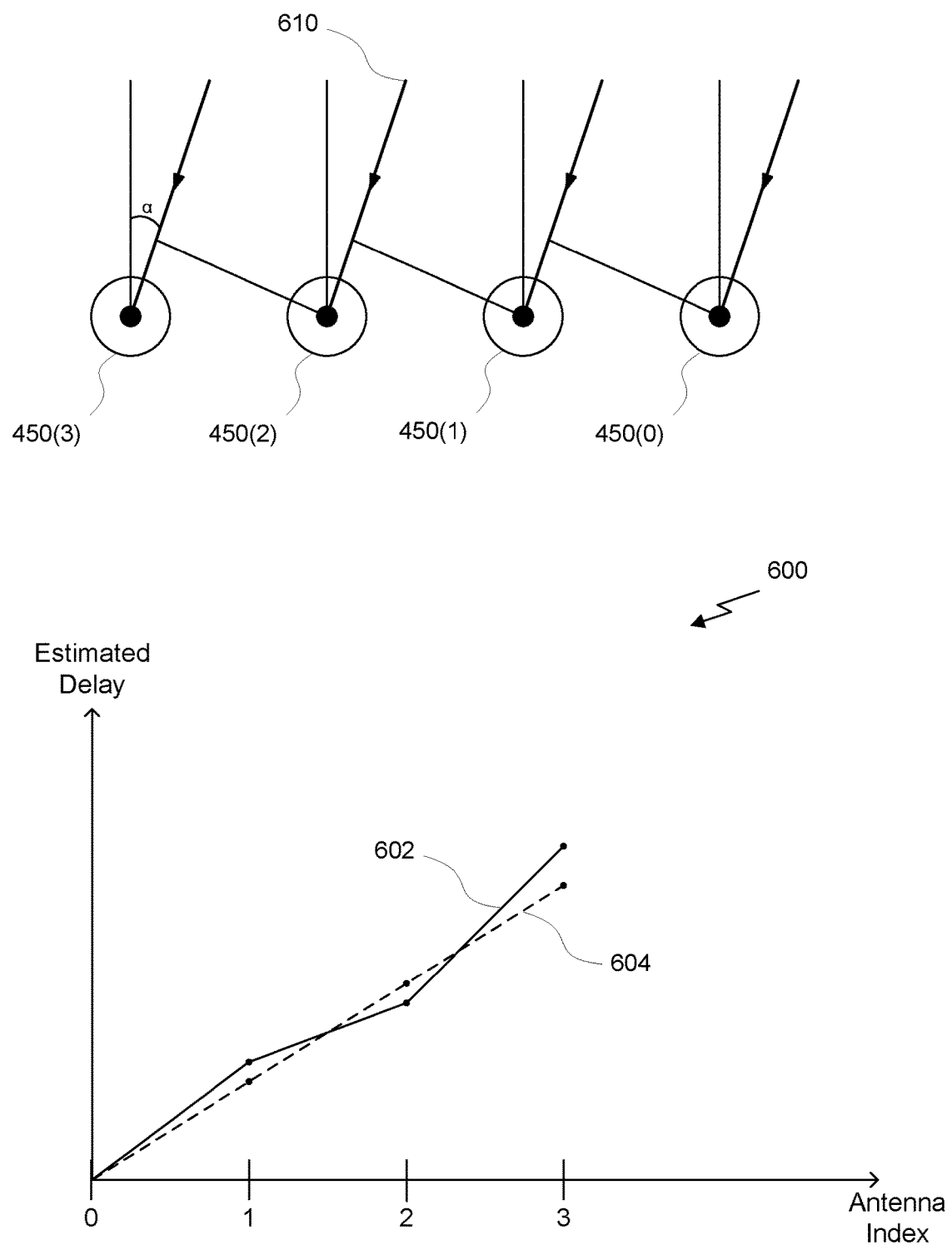
FIG. 6 illustrates a channel model for a MIMO array, in accordance with one embodiment.

FIG. 6 illustrates a channel model for a MIMO array 400, in accordance with one embodiment. As shown in FIG. 6, a plurality of antennas 450 are distributed in an array. An RF signal 610 from user k following path s will arrive at the antennas 450 from a direction $(\alpha_{k,s}, \beta_{k,s})$. When the RF signal 610 originates at a significant distance from the antennas 450, then the direction of the path of the RF signal 610 reaching each of the antennas 450 is substantially identical. FIG. 6 is simplified to only show a direction in azimuth (α) in an x-y plane, but the concept can be extended to three dimensions using direction in azimuth and zenith. As FIG. 6 makes clear, the RF signal 610 will reach a first antenna 450(0) at a first time $t_0$, a second antenna 450(1) at a second time $t_1$, a third antenna 450(2) at a third time $t_2$, and a fourth antenna 450(3) at a fourth time $t_3$. The RF signal 610 travels at a speed of light in air, or whatever medium surrounds the MIMO array 400. Consequently, the spatial parameters for direction of a signal can be calculated based on the positions of each antenna 450 and the measured delay at each antenna 450.

If the antennas of the MIMO array 400 are arranged with each antenna 450 positioned at equal intervals along a straight line, then the theoretical external delay offset at each antenna 450 should increase uniformly along the line as the signal reaches each antenna 450. In one embodiment, the antennas 450 are spaced at a distance equal to one wavelength of the RF signal 610.

Each antenna unit 210 may include an internal free running clock. Each clock may be operating at a particular frequency, and the antenna unit 210 may sample the signal on each antenna 450 associated with that antenna unit 210. The antenna unit 210 may then measure the delay of that antenna unit 210 by finding a start of the frame and comparing the location of the start of the frame to a reference signal. The measured delay plotted against the antenna unit index is plotted in a graph 600 to show the relationship of the delay measured by each antenna unit 210. The actual measurements 602 are shown as a solid line in graph 600. It will be readily apparent that the actual measurements may not lie on a straight line due to differences between the internal delay of each antenna unit 450 as well as accuracy of the positioning of each antenna 450. However, the actual measurements 602 of the delay may be fit to a line as a reconstructed estimate of the external delay curve 604. The line has a slope given by:

$$\frac{\lambda}{2 \cdot c} \sin(\alpha) \quad \text{(Eq. 5)}$$

As the speed of the EM wave and wavelength (i.e., frequency) of the carrier signal are known, we can calculate the direction of the signal arriving at the MIMO array 400. It will be appreciated that the concept shown in FIG. 6 applying only to the azimuth angle can be extended in three dimensions to both the azimuth angle and the zenith angle. Consequently, the spatial parameters for each antenna unit can be estimated using an opportunistic signal received at a plurality of antennas.

Figure 7:
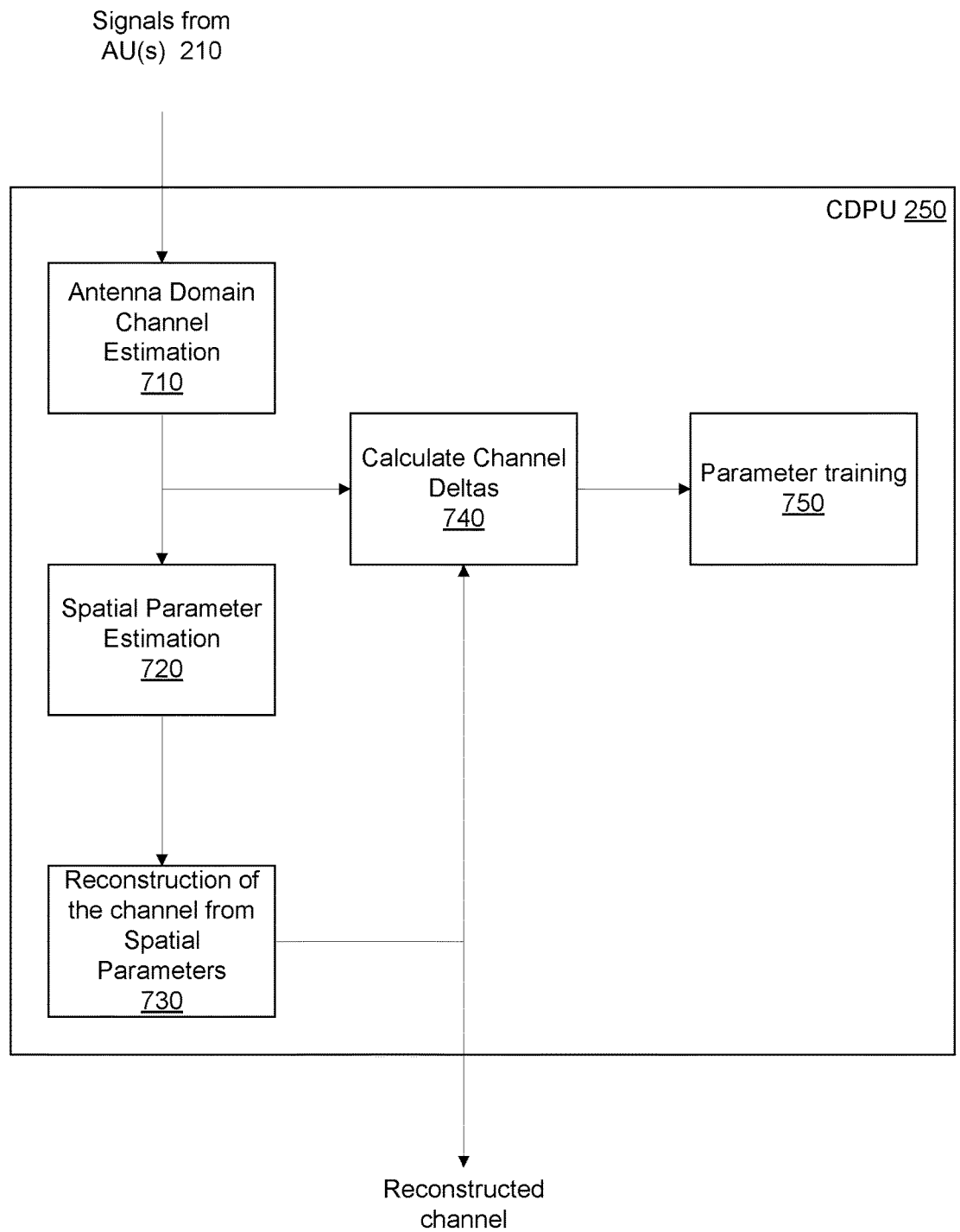
FIG. 7 illustrates a system for calibrating a MIMO array, in accordance with one embodiment.

FIG. 7 illustrates a system for calibrating a MIMO array 400, in accordance with one embodiment. As shown in FIG. 7, the CDPU 250 may receive samples from a plurality of antenna units 210. The samples are processed in a first logic block 710 to generate an antenna domain channel estimate $\hat{h}_{m,k}(n)$. The antenna domain channel estimate is a vector of symbols with a size m equal to the number of antenna units 210 in the MIMO array 400. It will be appreciated, that the antenna domain channel estimate may be modeled by the following equation:

$$\hat{h}_{m,k}(n) = \sum_{s=1}^{S} g_m \cdot g_{k,s} \cdot e^{(j(\varphi_{k,s}+\varphi_m))} \cdot \delta\left(n - \frac{1}{T_S} \cdot (\tau_{x,y,z} + \tau_{k,s} + \tau_m)\right) + err_{m,k}(n), \quad \text{(Eq. 6)}$$

where $err_{m,k}(n)$ is the antenna domain channel estimation error.

At logic block 720, the CDPU 250 may estimate a set of spatial parameters (e.g., $\check{g}_{k,s}, \check{\varphi}_{k,s}, \check{\alpha}_{k,s}, \check{\beta}_{k,s}$, and $\check{\tau}_{k,s}$) for each path s and user k based on the antenna domain channel estimation generated by logic block 710. Again, an estimate for the direction components of the spatial parameters can be derived from the measured delay at each of the antenna units 210. The other components of the spatial parameters (e.g., $\check{g}_{k,s}, \check{\varphi}_{k,s}$, and $\check{\tau}_{k,s}$) may be estimated using conventional techniques, such as by analyzing the antenna domain channel estimation vector. There are many algorithms for estimating spatial parameters from an antenna domain channel estimation vector, including spatial correlation algorithms and multiple signal classification algorithms as well as other algorithms well-known in the art.

At logic block 730, the CDPU 250 generates a reconstructed channel based on the estimated set of spatial parameters, as given by the following equation:

$$\breve{h}_{m,k}(n) = \sum_{s=1}^{S} \breve{g}_m \cdot \bar{g}_{k,s} \cdot e^{(j(\breve{\varphi}_{k,s}+\breve{\varphi}_m))} \cdot \delta\left(n - \frac{1}{T_S} \cdot (\bar{\tau}_{x,y,z} + \bar{\tau}_{k,s} + \breve{\tau}_m)\right), \quad \text{(Eq. 7)}$$

At logic block 740, the CDPU 250 compares the antenna domain channel estimate generated by logic block 710 with the reconstructed channel generated by logic block 730 to determine errors associated with the set of spatial parameters. Ideally, the antenna domain channel estimate and the reconstructed channel should be identical if the set of spatial parameters are exact. However, in practice, the estimates for the set of spatial parameters will not be exact, and the antenna domain channel estimate and the reconstructed channel will not match.

The errors for the gain parameter, the phase parameter, and the delay parameter for each antenna are sufficiently small, and not correlated between antennas, such that the estimate for the spatial parameters is relatively accurate even with antenna mismatch. The errors in the mismatch parameters may be defined by the following equations:

$$\Delta g_m = |\breve{g}_m| - |g_m|, \quad \text{(Eq. 8)}$$

$$\Delta \varphi_m = \text{angle}(\breve{\varphi}_m) - \text{angle}(\varphi_m), \quad \text{(Eq. 9)}$$

$$\Delta \tau_m = \breve{\tau}_m - \tau_m, \quad \text{(Eq. 10)}$$

where the gain mismatch is defined in Equation 8, the phase mismatch is defined in Equation 9, and the delay mismatch is defined in Equation 10. There are many ways to measure errors for the parameters given the antenna channel domain estimate and the reconstructed channel. In one embodiment, the error for the gain parameter of the antenna unit is generated by calculating a difference between a maximum magnitude of the antenna domain channel estimate and a maximum magnitude of the reconstructed channel, as shown:

$$\Delta g_m = \max(|\hat{h}_{m,k}(n)|) - \max(|\breve{h}_{m,k}(n)|) \quad \text{(Eq. 11)}$$

The error for the phase parameter is generated by calculating a difference between a phase of the antenna domain channel estimate at a time corresponding to a maximum magnitude of the antenna domain channel estimate and a phase of the reconstructed channel at a time corresponding to a maximum magnitude of the reconstructed channel, as shown by the following equation:

$$\Delta \varphi_m = \text{angle}(\hat{h}_{m,k}(\hat{n}_{max})) - \text{angle}(\breve{h}_{m,k}(\breve{n}_{max})) \quad \text{(Eq. 12)}$$

The time corresponding to a maximum magnitude of the antenna domain channel estimate is found by finding the time n corresponding to the maximum value of the antenna domain channel estimate, as shown in the following equation:

$$\hat{n}_{max} = \max_n \left(|\hat{h}_{m,k}(n)|\right) \quad \text{(Eq. 12)}$$

The time corresponding to a maximum magnitude of the reconstructed channel is found by finding the time n corresponding to the maximum value of the reconstructed channel, as shown in the following equation:

$$\breve{n}_{max} = \max_n \left(|\breve{h}_{m,k}(n)|\right) \quad \text{(Eq. 13)}$$

The error for the delay parameter may be generated in many ways. In one embodiment, the error for the delay parameter may be measured using a delay locked loop (DLL). In another embodiment, the error for the delay parameter may be measured utilizing a phase shift measurement in a frequency domain. In yet another embodiment, the error for the delay parameter may be measured utilizing a correlation between the reconstructed channel and delayed versions of the antenna domain channel estimate, as shown in the following equation:

$$\Delta \tau_m = \max_{\Delta \tau_m} \left( \text{Re}\left( \sum_{n=1}^{N} \hat{h}^*_{m,k}\left(n - \frac{\Delta \tau_m}{T_S}\right) \cdot \breve{h}_{m,k}(n) \right) \right) \quad \text{(Eq. 14)}$$

At logic block 750, the CDPU 550 adjusts the set of mismatch parameters for each antenna unit based on the errors. In one embodiment, the gain, phase, and time offsets for each antenna unit are averaged over a long period and for many different users. Averaging over time may be implemented by adding the current spatial parameter to an error for the spatial parameter multiplied by a coefficient, as shown by the following equations:

$$g_m = g_m + \mu \cdot \Delta g_m, \quad \text{(Eq. 15)}$$

$$\varphi_m = \varphi_m + \mu \cdot \Delta \varphi_m, \quad \text{(Eq. 16)}$$

$$\tau_m = \tau_m + \mu \cdot \Delta \tau_m, \quad \text{(Eq. 17)}$$

where the coefficient $\mu$ is less than or equal to 1.

Figure 8:
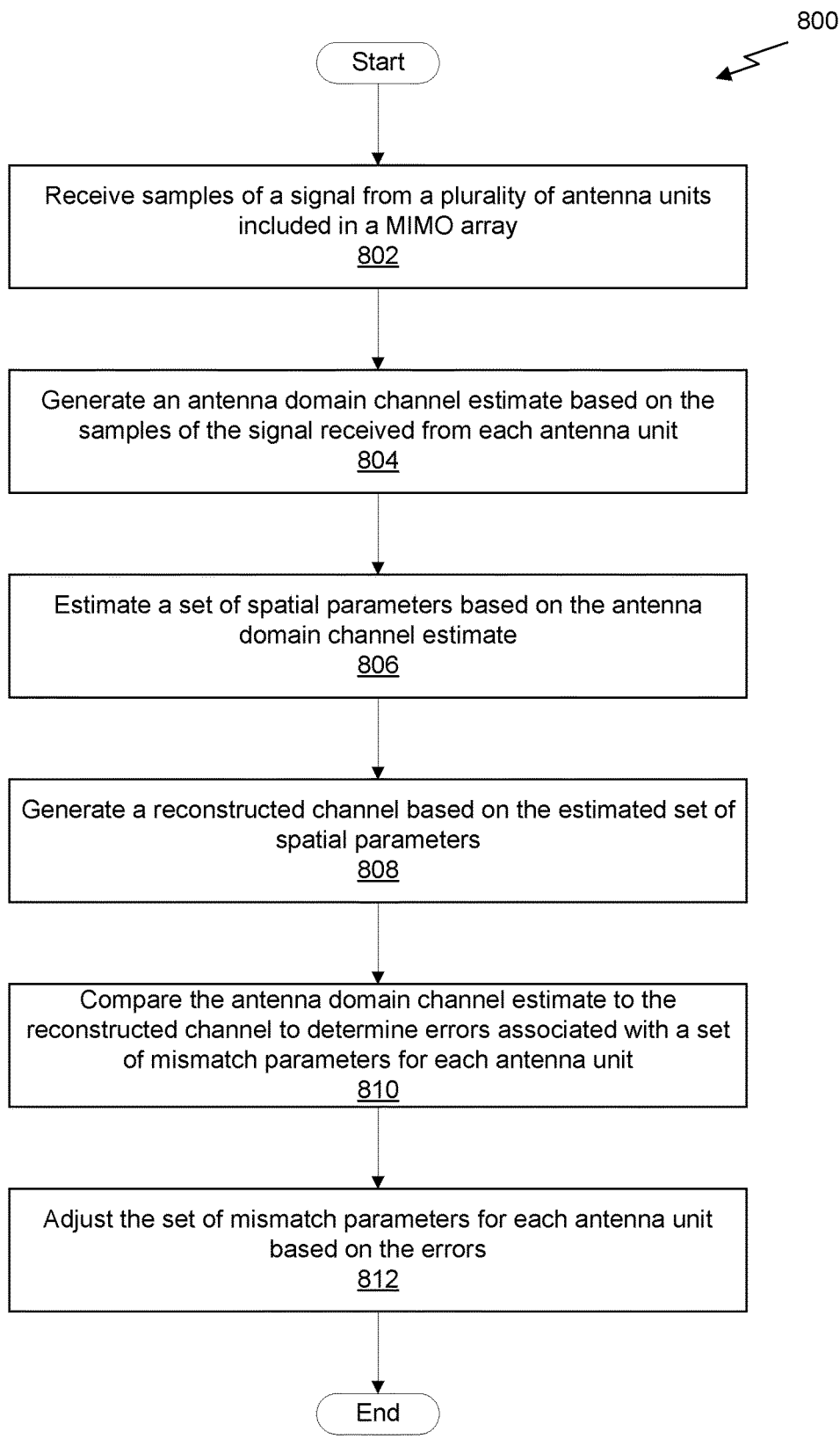
FIG. 8 is a flowchart of a method for calibrating a MIMO array, in accordance with one embodiment.

FIG. 8 is a flowchart of a method 800 for calibrating a MIMO array, in accordance with one embodiment. The method 800 may be performed by hardware, software, or a combination of hardware and software. In one embodiment, the method 800 is implemented by a CDPU 250 coupled to a plurality of antenna units 210 of a MIMO array 400.

At step 802, samples of a signal are received from a plurality of antenna units included in a MIMO array. Each antenna unit in the MIMO array may include a free-running clock used to sample a signal received via an antenna. The clocks in each of the antenna units do not need to be synchronized.

At step 804, an antenna domain channel estimate is generated based on the samples of the signal received from each antenna unit. At step 806, a set of spatial parameters are estimated based on the antenna domain channel estimate. Estimating a set of spatial parameters for each antenna unit in the plurality of antenna units may include measuring a delay associated with each antenna unit based on an opportunistic signal that arrives at the MIMO array. At step 808, a reconstructed channel is generated based on the estimated set of spatial parameters. In one embodiment, mismatch parameters are configured for each antenna unit, and the mismatch parameters and estimated set of spatial parameters are utilized to generate the reconstructed signal. Initially, the mismatch parameters for each antenna unit may be set to default values (e.g., gain parameter set to 1, with zero phase delay and zero time delay) that are the same for all antenna units in the MIMO array. At step 810, the antenna domain channel estimate is compared to the reconstructed channel to determine errors in a set of mismatch parameters for each antenna unit. At step 812, the set of mismatch parameters is adjusted based on the errors.

Figure 9:
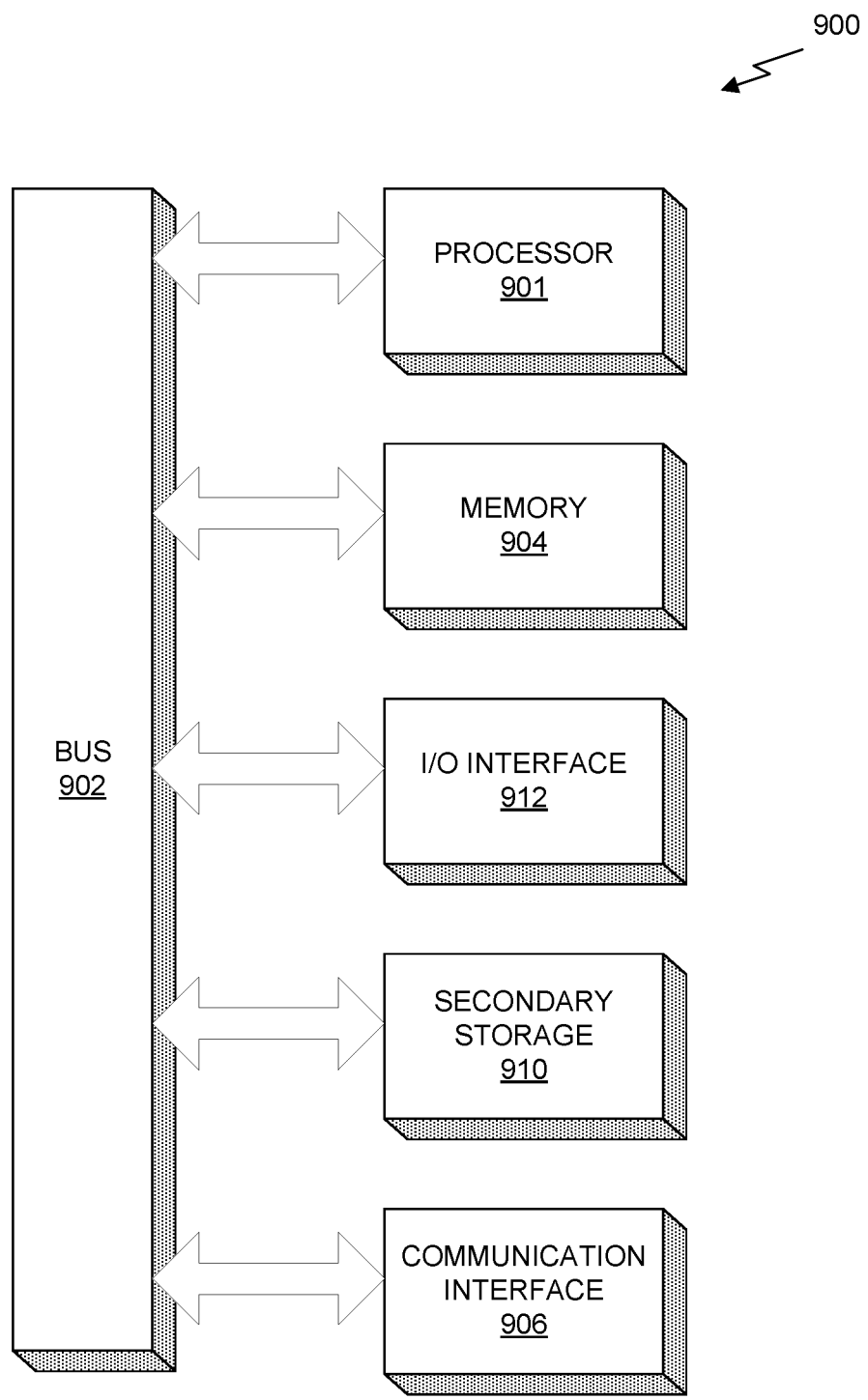
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one processor 901 that is connected to a communication bus 902. The communication bus 902 may be implemented using any suitable protocol, such as PCI (Peripheral Component Interconnect), PCI-Express, AGP (Accelerated Graphics Port), Hyper-Transport, or any other bus or point-to-point communication protocol(s). The system 900 also includes a memory 904. Control logic (software) and data are stored in the memory 904 which may take the form of random access memory (RAM).

The system 900 also includes an input/output (I/O) interface 912 and a communication interface 906. User input may be received from the input devices 912, e.g., keyboard, mouse, touchpad, microphone, and the like. In one embodiment, the communication interface 906 may be coupled to a graphics processor (not shown) that includes a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the processor 901, a graphics processor coupled to communication interface 906, an integrated circuit (not shown) that is capable of at least a portion of the capabilities of both the processor 901 and a graphics processor, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method for calibrating elements of a Multiple-Input, Multiple-Output (MIMO) array, comprising:
   receiving samples of a signal from a plurality of antenna units included in the MIMO array, wherein each antenna unit in the plurality of antenna units is configured to sample the signal based on a clock corresponding with the antenna unit;
   generating an antenna domain channel estimate based on the samples of the signal received from each antenna unit;
   estimating a set of spatial parameters based on the antenna domain channel estimate;
   generating a reconstructed channel based on the estimated set of spatial parameters;
   comparing the antenna domain channel estimate and the reconstructed channel to determine errors associated with a set of mismatch parameters for each antenna unit; and
   adjusting the set of mismatch parameters based on the errors.

2. The method of claim 1, wherein each antenna unit includes an antenna coupled to a transceiver.

3. The method of claim 1, wherein estimating a set of spatial parameters for each antenna unit in the plurality of antenna units comprises measuring a delay associated with each antenna unit.

4. The method of claim 1, wherein the set of mismatch parameters for a particular antenna unit in the plurality of antenna units includes a delay parameter of the particular antenna unit, a gain parameter of the particular antenna unit, and a phase parameter of the particular antenna unit.

5. The method of claim 4, wherein comparing the antenna domain channel estimate and the reconstructed channel to determine errors associated with the set of mismatch parameters for a particular antenna unit comprises generating an error for the delay parameter of the particular antenna unit, an error for the gain parameter of the particular antenna unit, and an error for the phase parameter of the particular antenna unit.

6. The method of claim 5, wherein the error for the delay parameter of the particular antenna unit is generated utilizing at least one of:
   a delay locked loop (DLL);
   a phase shift measurement in a frequency domain; and
   a correlation between the reconstructed channel and delayed versions of the antenna domain channel estimate.

7. The method of claim 5, wherein the error for the gain parameter of the particular antenna unit is generated by calculating a difference between a maximum magnitude of the antenna domain channel estimate and a maximum magnitude of the reconstructed channel.

8. The method of claim 5, wherein the error for the phase parameter of the particular antenna unit is generated by calculating a difference between a phase of the antenna domain channel estimate at a time corresponding to a maximum magnitude of the antenna domain channel estimate and a phase of the reconstructed channel at a time corresponding to a maximum magnitude of the reconstructed channel.

9. The method of claim 1, wherein adjusting the set of mismatch parameters based on the errors comprises, for at least one mismatch parameter in the set of mismatch parameters, adding the current mismatch parameter to an error for the mismatch parameter multiplied by a coefficient, wherein the coefficient is less than or equal to one.

10. A system for calibrating elements of a Multiple-Input, Multiple-Output (MIMO) array, comprising:
the MIMO array, wherein the MIMO array includes a plurality of antenna units, each antenna unit configured to sample a signal based on a clock corresponding with the antenna unit; and
a channel decoder processing unit (CDPU) coupled to the plurality of antenna units, the CDPU configured to:
receive samples of the signal from a plurality of antenna units included in the MIMO array,
generate an antenna domain channel estimate based on the samples of the signal received from each antenna unit,
estimate a set of spatial parameters for each antenna unit in the plurality of antenna units based on the antenna domain channel estimate,
generate a reconstructed channel based on the set of spatial parameters estimated for each antenna unit,
compare the antenna domain channel estimate and the reconstructed channel to determine errors associated with a set of mismatch parameters for each antenna unit, and
adjust the set of mismatch parameters based on the errors.

11. The system of claim 10, wherein each antenna unit includes an antenna coupled to a transceiver.

12. The system of claim 10, wherein estimating a set of spatial parameters for each antenna unit in the plurality of antenna units comprises measuring a delay associated with each antenna unit.

13. The system of claim 10, wherein the set of mismatch parameters for a particular antenna unit in the plurality of antenna units includes a delay parameter of the particular antenna unit, a gain parameter of the particular antenna unit, and a phase parameter of the particular antenna unit.

14. The system of claim 13, wherein comparing the antenna domain channel estimate and the reconstructed channel to determine errors associated with the set of mismatch parameters for a particular antenna unit comprises generating an error for the delay parameter of the particular antenna unit, an error for the gain parameter of the particular antenna unit, and an error for the phase parameter of the particular antenna unit.

15. The system of claim 14, wherein the error for the delay parameter of the particular antenna unit is generated utilizing at least one of:
a delay locked loop (DLL);
a phase shift measurement in a frequency domain; and
a correlation between the reconstructed signal and delayed versions of the antenna domain channel estimate.

16. The system of claim 14, wherein the error for the gain parameter of the particular antenna unit is generated by calculating a difference between a maximum magnitude of the antenna domain channel estimate and a maximum magnitude of the reconstructed channel.

17. The system of claim 14, wherein the error for the phase shift parameter of the particular antenna unit is generated by calculating a difference between a phase of the antenna domain channel estimate at a time corresponding to a maximum magnitude of the antenna domain channel estimate and a phase of the reconstructed channel at a time corresponding to a maximum magnitude of the reconstructed channel.

18. The system of claim 14, wherein adjusting the set of mismatch parameters based on the errors comprises, for at least one mismatch parameter in the set of mismatch parameters, adding the current mismatch parameter to an error for the mismatch parameter multiplied by a coefficient, wherein the coefficient is less than or equal to one.

19. A non-transitory computer-readable media storing computer instructions for calibrating elements of a Multiple-Input, Multiple-Output (MIMO) array that, when executed by one or more processors, cause the one or more processors to perform the steps of:
receiving samples of a signal from a plurality of antenna units included in the MIMO array, wherein each antenna unit in the plurality of antenna units is configured to sample the signal based on a clock corresponding with the antenna unit;
generating an antenna domain channel estimate based on the samples of the signal received from each antenna unit;
estimating a set of spatial parameters for each antenna unit in the plurality of antenna units based on the antenna domain channel estimate;
generating a reconstructed channel based on the set of spatial parameters estimated for each antenna unit;
comparing the antenna domain channel estimate and the reconstructed channel to determine errors associated with a set of mismatch parameters for each antenna unit; and
adjusting the set of mismatch parameters based on the errors.

20. The non-transitory computer-readable media of claim 19, wherein estimating a set of spatial parameters for each antenna unit in the plurality of antenna units comprises measuring a delay associated with each antenna unit.

21. The non-transitory computer-readable media of claim 19, wherein the set of mismatch parameters for a particular antenna unit in the plurality of antenna units includes a delay parameter of the particular antenna unit, a gain parameter of the particular antenna unit, and a phase parameter of the particular antenna unit.

22. The non-transitory computer-readable media of claim 21, wherein comparing the antenna domain channel estimate and the reconstructed channel to determine errors associated with the set of mismatch parameters for a particular antenna unit comprises generating an error for the delay parameter of the particular antenna unit, an error for the gain parameter of the particular antenna unit, and an error for the phase parameter of the particular antenna unit.

23. The non-transitory computer-readable media of claim 22, wherein the error for the delay parameter of the particular antenna unit is generated utilizing at least one of:
a delay locked loop (DLL);
a phase shift measurement in a frequency domain; and
a correlation between the reconstructed signal and delayed versions of the antenna domain channel estimate.

24. The non-transitory computer-readable media of claim 22, wherein the error for the gain parameter of the particular antenna unit is generated by calculating a difference between a maximum magnitude of the antenna domain channel estimate and a maximum magnitude of the reconstructed channel.

25. The non-transitory computer-readable media of claim 22, wherein the error for the phase shift parameter of the particular antenna unit is generated by calculating a difference between a phase of the antenna domain channel estimate at a time corresponding to a maximum magnitude of the antenna domain channel estimate and a phase of the reconstructed channel at a time corresponding to a maximum magnitude of the reconstructed channel.

* * * * *